United States Patent [19]
Haka

[11] Patent Number: 6,045,476
[45] Date of Patent: Apr. 4, 2000

[54] TRANSFER GEARING APPARATUS FOR AN ALL WHEEL DRIVE

[75] Inventor: Raymond James Haka, Brighton, Mich.

[73] Assignee: General Motors Corporation, Detroit, Mich.

[21] Appl. No.: 09/323,409

[22] Filed: Jun. 1, 1999

[51] Int. Cl.[7] ................................................ F16H 37/08
[52] U.S. Cl. .......................... 475/198; 475/201; 475/205; 475/221; 475/339; 180/248
[58] Field of Search ................................. 475/198, 201, 475/204, 205, 221, 339; 180/248

[56] References Cited

U.S. PATENT DOCUMENTS

| 4,523,493 | 6/1985 | Weib | 475/221 |
| 4,572,318 | 2/1986 | Cady | 475/201 |
| 4,691,593 | 9/1987 | Mueller | 475/221 |
| 4,779,487 | 10/1988 | Pitsch et al. | 475/221 |
| 5,607,372 | 3/1997 | Lohr | 475/216 |
| 5,951,430 | 9/1999 | Kobayashi | 475/339 |

*Primary Examiner*—Sherry L. Estremsky
*Attorney, Agent, or Firm*—Dean L. Ellis; Michael J. Bridges

[57] ABSTRACT

An all wheel drive transmission has a transfer gearing apparatus disposed in axial alignment between a hydrodynamic input drive and an input member of a planetary transmission. The transfer gearing apparatus delivers power from the hydrodynamic drive to the planetary transmission and from a differential output of the planetary transmission to a first output drive member. A second output drive member is connected to the differential output. One output drive member is connectable with the front drive wheels of a vehicle and the other output drive member is connected with the rear drive wheels of the vehicle.

3 Claims, 1 Drawing Sheet

TRANSFER GEARING APPARATUS FOR AN ALL WHEEL DRIVE

TECHNICAL FIELD

This invention relates to power transmissions and more particularly to transfer gearing apparatus in an all wheel drive powertrain.

BACKGROUND OF THE INVENTION

An all wheel drive powertrain generally consists of an engine, a multi-speed power transmission, a transfer gearing assembly and front and rear drive shafts. The transfer gearing assembly is contained in a transfer case that is secured to the outboard end of the power transmission. This requires that the transfer case is supported in cantilever fashion on the power transmission housing. In the alternative, additional support members are secured to the underside of the vehicle during assembly to brace the transfer case.

SUMMARY OF THE INVENTION

It is an object of the present invention to provide an improved all wheel drive powertrain.

In one aspect of the present invention, a transfer gearing apparatus is disposed in an axial power flow path between a hydrodynamic drive input and a multi-speed planetary transmission. In another aspect of the present invention, the transfer gearing transmits power from the hydrodynamic drive to the planetary transmission and from the planetary transmission to an output drive member.

In yet another aspect of the present invention, the transfer gearing includes a pair of identical sun gears and a planet carrier assembly having a plurality of rotatably mounted pinion gears meshing with both of the sun gears. In still another aspect of the present invention, one sun gear is driven by the hydrodynamic drive, the other sun gear provides input power to the multi-speed transmission and the planet carrier assembly drives an output chain drive assembly.

In a further aspect of the present invention, input power from the hydrodynamic drive is transmitted through the one sun gear, the pinion gears and the other sun gear to the multi-speed transmission. In a yet further aspect of the present invention, the multi-speed transmission has a differential output assembly which is drivingly connected to a cage of the planet carrier assembly and to a power output member. In a still further aspect of the present invention, the cage delivers power to the front wheels of a vehicle through the chain drive assembly, and the power output member delivers power to the rear wheels of the vehicle. In a yet still further aspect of the present invention, an all wheel drive multi-speed transmission is provided with a central transfer gearing disposed in power flow relation between a torque converter and a planetary transmission for distributing power from a power source to a multi-speed transmission and from the transmission to one set of vehicle drive wheels.

BRIEF DESCRIPTION OF THE DRAWINGS

The drawing is a schematic representation of a powertrain having a torque converter, a multi-speed power transmission and a central transfer gearing.

DESCRIPTION OF AN EXEMPLARY EMBODIMENT

Figure 1:
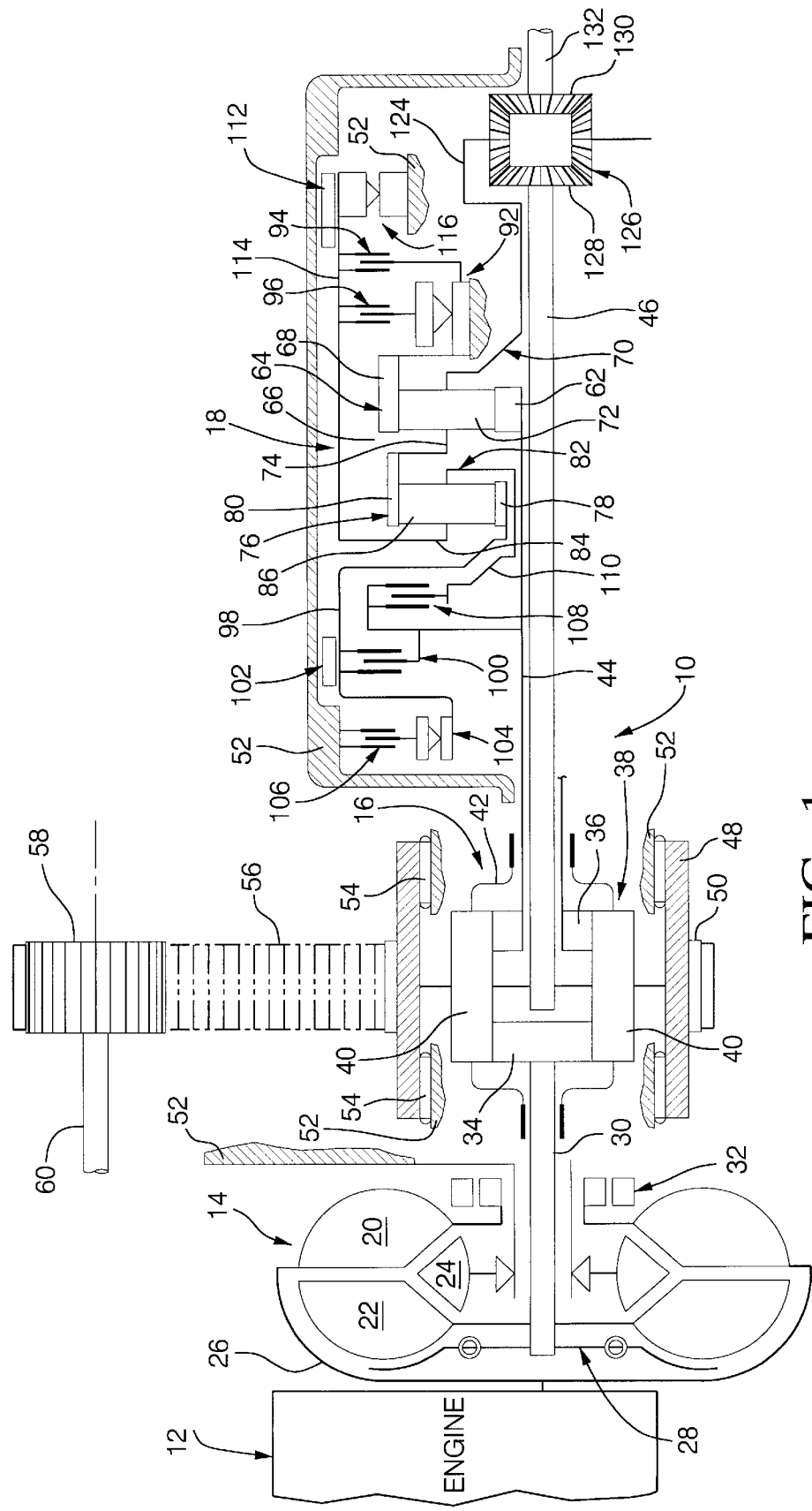

A powertrain 10 has an engine 12, a torque converter 14, a central transfer gearing 16 and a multi-ratio planetary transmission 18. The engine 12 is a conventional internal combustion prime mover, the operation of which is well known to those skilled in the art. The torque converter 14, which is also a conventional power transfer device, has an impeller 20, a turbine 22 and a stator 24. The impeller 20 is driven by the engine 12 through a flex plate 26. A conventional torque converter clutch 28 is disposed for selective engagement between the turbine 22 and the flex plate 26. Both the turbine 22 and the flex plate 26 are drivingly connected with a torque converter output shaft 30. Engagement of the torque converter clutch 28 connects the engine 12 directly with the shaft 30, which removes the torque converter form the power path in a well-known manner.

During normal torque converter operation, a control pump 32 supplies pressurized hydraulic fluid to a control system, not shown, which directs a portion of the hydraulic fluid to the torque converter 14. A portion of the fluid is distributed to the planetary transmission 18 for operation of a plurality of selectively engageable clutches and brakes used therein. When the torque converter is operating, the engine 12 supplies power to the impeller 20, which converts the mechanical input to hydrodynamic power which is delivered to the turbine 22 and then distributed to the shaft 30 as mechanical power.

The stator 24 redirects the fluid from the turbine 22 to the impeller 20 in a well-known manner to increase the torque multiplication through the torque converter 14. As the torque converter 14 approaches the "coupling point", the fluid leaving the turbine impinges on the back side of the stator blades to cause forward rotation of the stator 24 and reduce the torque multiplication of the torque converter 14 to approximately one.

The shaft 30 is drivingly connected with a sun gear 34 which is a member of the central transfer gearing 16. The central transfer gearing 16 also includes a sun gear 36 and a carrier assembly 38 which is comprised of a plurality of pinion gears 40 rotatably mounted in a cage or spider 42. The sun gear 34 and the sun gear 36 have the same pitch diameter and the same number of teeth. The sun gear 36 is drivingly connected with a planetary input sleeve shaft 44, and the cage 42 of the carrier assembly 38 is drivingly connected with a differential output shaft 46. The carrier has an outer hub 48 on which is formed or otherwise secured to a sprocket 50. The outer hub 48 is rotatably supported on a powertrain housing 52 by bearings 54. A flexible chain 56 is trained between the sprocket 50 and an output sprocket 58 which is drivingly connected with a powertrain output shaft 60. The output shaft 60 can be connected with either the front or rear vehicle wheel drive mechanisms, not shown. For the purposes of this disclosure, it will be assumed that the shaft 60 is drivingly connected with the front wheel drive mechanism.

The sleeve shaft 44 is drivingly connected with a sun gear 62 of a simple planetary gear set 64 in a planetary gear arrangement 66 which is a component of the planetary transmission 18. The planetary gear set 64 also includes a ring gear 68 and a carrier assembly 70 having a plurality of pinion gears 72, meshing with the sun gear 62 and ring gear 68, rotatably mounted on a cage or spider 74. The planetary gear arrangement 66 also includes a second planetary gear set 76 which has a sun gear 78, a ring gear 80 and a carrier assembly 82 including a cage or spider 84 in which is rotatably mounted a plurality of pinion gears 86. The pinion gears 86 are in meshing relation between the sun gear 62 and the ring gear 68.

The cage 74 of the carrier assembly 70 is drivingly connected with the ring gear 80 and a carrier assembly 120 of a center differential assembly 126. The ring gear 68 is operatively connected with a one-way torque transmitting device 92 and a selectively engageable friction clutch 94. The one-way torque transmitting device 92 is also connected with a selectively engageable friction clutch 96. The sun gear 78 is drivingly connected with a hub 98 which is operatively connected with a selectively engageable friction clutch 100, a selectively engageable friction brake 102 and a one-way torque transmitting device 104. The one-way torque transmitting device 104 is operatively connected with a selectively engageable friction brake 106. The carrier assembly 82 is operatively connected with a selectively engageable friction clutch 108 through a hub 110 and with the selectively engageable friction clutch 96, the selectively engageable friction clutch 94 and a selectively engageable friction brake 112 through a hub 114. The selectively engageable friction clutches are preferably fluid-operated multi-plate devices which are well known in the art of power transmission. The hub 114 is also operatively connected with a one-way torque transmitting device 116. The selectively engageable friction clutches 100 and 108 are also operatively connected with the shaft 44.

The selectively engageable friction brakes are preferably either fluid-operated band-type devices or multi-plate devices which are also well known in the art of power transmission. The selectively engageable friction brakes 102, 106 and 112 are also operatively connected with the powertrain housing 52 so as to restrain the controlled member from rotation when the brakes are engaged. The one-way torque transmitting device 116 is also operatively connected between the housing 52 and the hub 114 to restrain the ring gear 68 from rotating in a direction opposite to the input shaft 44 when the clutch 96 is engaged.

The carrier assembly 70 is drivingly connected with the center differential assembly 126 which has two output side gears 128 and 130. The side gear 128 is drivingly connected with the shaft 46 and the side gear 130 is drivingly connected with an output shaft 132 which is drivingly connected to a rear wheel drive mechanism, not shown. The center differential assembly 126 will balance the torque between the front and rear drive mechanisms. Hence, the term center differential. The differential assembly 126 is a conventional unit well known to those skilled in the transmission art.

The planetary transmission 18 is controllable in a well-known manner to provide four forward drive ratios and one reverse drive ratio through the judicious actuation of the clutches and brakes. For example, in the first and lowest drive ratio, the clutch 96 is engaged and the one-way device 116 cooperates therewith to provide a reaction member at the ring gear 68 while the sun gear 62 is driven by the engine through the central transfer gearing 16. The second forward drive ratio is provided by the brake 106 while the clutch 96 remains engaged. The third forward ratio is established by the engagement of the clutch 108. The clutch 96 remains engaged and the brake 106 can also remain engaged since the one-way devices 116 and 104 will overrun. The fourth forward ratio is established by the engagement of the brake 102. The clutches 96 and 108 remain engaged and the brake 106 can also remain engaged. The one-way devices 116, 104 and 92 will be in an overrun condition. The reverse drive is established by the engagement of the clutch 100 and the brake 112. All other friction devices are disengaged. The clutch 94 can be engaged if engine coast braking is desired in the third ratio, and the brake 112 is engaged if engine braking is desired in the first ratio.

When a drive ratio is engaged and the vehicle brakes are released, the differential assembly 126 is rotated, which in turn rotates the shafts 46 and 132. The shaft 46 rotates the carrier assembly 38 and therefore the shaft 60 through the chain 56. The rotation of the carrier does not affect the rotary speed of the sun gears 34 and 36.

The central transfer gearing 16 is effective to transmit input power from the shaft 30 to the shaft 44 while simultaneously transmitting output power from the differential assembly 126 to the carrier assembly 38. This unique gear arrangement of the central transfer gearing 16 permits the assembly to position a power takeoff from the multi-speed transmission in power flow relation between a power input and a multi-speed power transmission. This arrangement increases the natural frequency of the powertrain as compared with conventional all wheel drives which suspend a power takeoff from the rear of the power transmission housing. The increase in the natural frequency reduces the noise and vibration levels of the powertrain and thereby improves the life of the powertrain and the perceived operation of the vehicle by the driver.

What is claimed is:

1. An all wheel drive powertrain comprising:

a power input means including a torque converter;

a multi-speed power transmission means for providing a power output having a transmission differential assembly for distributing power to the drive wheels of a vehicle including a front wheel drive mechanism and a rear wheel drive mechanism;

a central transfer gearing assembly positioned in power flow between said power input means and said multi-speed power transmission means comprising: a first sun gear drivingly connected with said power input means, a second sun gear connected with an input member of said multi-speed power transmission, and a carrier assembly having a cage and a plurality of pinion gears rotatably mounted in said cage, said pinion gears interconnecting said first sun gear and said second sun gear to deliver power therebetween and said cage being connected between said transmission differential assembly and one of said front wheel drive mechanism and said rear wheel drive mechanism.

2. An all wheel drive powertrain comprising:

an input power means for supplying power;

a multi-speed power transmission means for delivering a plurality of drive ratios to a differential for distribution to a front wheel drive mechanism and to a rear wheel drive mechanism;

a central transfer gearing and power takeoff means disposed in power flow relation between said input power means and said multi-speed power transmission means for delivering power from said input power means to said multi-speed power transmission means and being disposed in series power flow relation between said multi-speed power transmission means and either said front wheel drive mechanism or said rear wheel drive mechanism.

3. The all wheel powertrain defined in claim 2 wherein said central transfer gearing and power take off means comprises:

an input gear member disposed to receive power from said power input means, a first output gear member to deliver power to said multi-speed power transmission means and a carrier assembly means having a transfer gear means supported on an output member for transmitting power between said input gear member and said first output gear member and said output member delivering power to said wheel drive mechanism.

\* \* \* \* \*